US007685946B1

(12) United States Patent
Elstone, III (10) Patent No.: US 7,685,946 B1
(45) Date of Patent: Mar. 30, 2010

(54) TUBULAR TRANSPORTER

(76) Inventor: John M. Elstone, III, 25 Flax Isle Dr., Little Egg Harbor, NJ (US) 08087

( * ) Notice: Subject to any disclaimer, the term of this patent is extended or adjusted under 35 U.S.C. 154(b) by 242 days.

(21) Appl. No.: 11/823,001

(22) Filed: Jun. 25, 2007

(51) Int. Cl.
 *B61B 13/10* (2006.01)
(52) U.S. Cl. .................. 104/138.2; 104/138.1
(58) Field of Classification Search .......... 104/138.1, 104/138.2; 405/128.25
See application file for complete search history.

(56) References Cited

U.S. PATENT DOCUMENTS

| | | | | |
|---|---|---|---|---|
| 3,505,820 | A * | 4/1970 | Bennett et al. | 405/53 |
| 4,113,236 | A * | 9/1978 | Neinast | 254/134.5 |
| 4,177,734 | A * | 12/1979 | Rhoden | 104/138.2 |
| 4,209,269 | A * | 6/1980 | Martinez | 405/184.5 |
| 4,369,713 | A * | 1/1983 | Richardson | 104/138.2 |
| 4,370,113 | A * | 1/1983 | Nakashin | 425/13 |
| 4,458,601 | A * | 7/1984 | Braithwaite et al. | 104/138.2 |
| 4,635,559 | A * | 1/1987 | Nelson | 104/119 |
| 4,981,080 | A * | 1/1991 | Elstone, III | 104/138.2 |
| 5,197,824 | A * | 3/1993 | Paurat et al. | 405/129.7 |
| 5,293,823 | A * | 3/1994 | Box | 104/138.2 |
| 5,794,703 | A * | 8/1998 | Newman et al. | 166/381 |
| 6,082,461 | A * | 7/2000 | Newman et al. | 166/381 |
| 6,089,323 | A * | 7/2000 | Newman et al. | 166/381 |
| 6,302,659 | B1 * | 10/2001 | Parker et al. | 417/273 |
| 6,450,104 | B1 * | 9/2002 | Grant et al. | 104/138.2 |
| 7,370,445 | B2 * | 5/2008 | Mijatovic | 37/318 |
| 7,398,736 | B2 * | 7/2008 | Appleton | 104/138.2 |
| 2004/0173116 | A1 * | 9/2004 | Ghorbel et al. | 104/138.2 |
| 2005/0139286 | A1 * | 6/2005 | Poulter et al. | 141/234 |
| 2007/0000406 | A1 * | 1/2007 | Stout | 104/138.2 |
| 2007/0104540 | A1 * | 5/2007 | Howard | 405/128.25 |
| 2007/0151475 | A1 * | 7/2007 | Nicholson | 104/138.2 |
| 2008/0245258 | A1 * | 10/2008 | Herron et al. | 104/138.2 |

* cited by examiner

*Primary Examiner*—S. Joseph Morano
*Assistant Examiner*—Jason C Smith
(74) *Attorney, Agent, or Firm*—Michael R. Philips (57) ABSTRACT

The tubular transporter for moving a submersible pump through a collecting pipe under a landfill has a set of wheels angularly mounted to a cylindrical housing in positions above a center of gravity of the transporter. The transporter has a screen at a suction end and an end plate at a discharge end. The end plate has a vent hole with an optional plug. A pressure sensor is removably mounted to the housing and operates for determining when sufficient water is present to actuate the pump. The pump discharges the water to be treated prior to being returned to the ground. A series of hose dollies are mounted to the discharge hose to enable entry into a long collection pipe.

17 Claims, 7 Drawing Sheets

TUBULAR TRANSPORTER

FIELD OF THE INVENTION

The present invention relates to the field of submersed pump apparatus, and more particularly to a wheeled device for transporting a pump or other apparatus in an enclosed space.

BACKGROUND OF THE INVENTION

Residential and industrial waste is generally deposited in a landfill. A landfill is created by excavating a depression in the ground for the deposit of waste. A well known drawback of landfills is that rain water will absorb chemical residue from the deposited waste and carry the chemicals to the bottom of the landfill. The mix of chemicals and water is known as a leachate, a solution of chemicals leached from the waste. The leachate is often harmful, and sometimes toxic, to plants and animals. Without intervention, the leachate would permeate the ground below the landfill and enter the water supply. To prevent the rain water from carrying the chemical residue into underground streams or aquifers, a durable, liquid impervious liner is placed into the excavated depression to trap the water. However, the trapped leachate must be removed from the excavated depression or it will continue to accumulate, ultimately to overflow the depression and enter the adjacent ground and water supply.

A network of pipes, some of which are perforated, is built for collecting the leachate from the lined landfill depression and pumping the leachate to a purification facility to remove or neutralize the chemicals. After purification, the treated water may be reintroduced into the usable water system. Typically, the pipe network is formed of a chemically inert resin, e.g. high density polyethylene (HDPE). To form the pipe network, sections of HDPE pipe are thermally welded to one another, often resulting in a protruding weld joint. The pipe network is assembled on the landfill liner before waste is deposited. A bed of pervious gravel is spread on the pipe network to stabilize and protect the pipes. A submersible pump, placed within a centrally positioned collecting pipe, is employed to remove the leachate from the landfill. To enable the pump to be moved along a longitudinal path into and out of the central collecting pipe, a pump transporter device is used. The overall landfill system including a pump and a known pump transporter are described in detail in U.S. Pat. No. 4,981,080 of the present inventor. U.S. Pat. No. 4,981,080 is incorporated herein in its entirety. The present invention provides improvements over the known transporter as described in detail below.

SUMMARY OF THE INVENTION

The improved tubular transporter of the present invention utilizes a cylindrical housing for enclosing a submersible pump, one end of the housing being enclosed with a removable screen for preventing debris from entering the pump and a discharge hose mounted at the other end. The pump is assembled to an end plate with a set of radially extending tabs configured for engaging mating slots in the second end of the housing and having a set of connective studs for securement. A vent opening is provided in the end plate to allow entrapped air to escape. A skid plate is mounted to the forward end of the transporter to ease passage over obstacles such as weld joints in the pipe. A pressure sensor is mounted to the transporter for activating the pump when water has reached a selected level. When the landfill is large, the central collecting pipe is long, in some cases up to several hundred feet. To overcome the drag of pushing a long discharge hose into a long collecting pipe, a series of wheeled hose dollies are connected at intervals along the hose length. While the preferred embodiment of the invention is described primarily in relation to carrying a submersible pump, the invention is contemplated to also be useful for moving a camera or robotic device in remote environments.

BRIEF DESCRIPTION OF THE DRAWINGS

The present invention is best understood in conjunction with the accompanying drawing figures in which like elements are identified by similar reference numerals and wherein.

DETAILED DESCRIPTION OF THE PREFERRED EMBODIMENT

Figure 1:
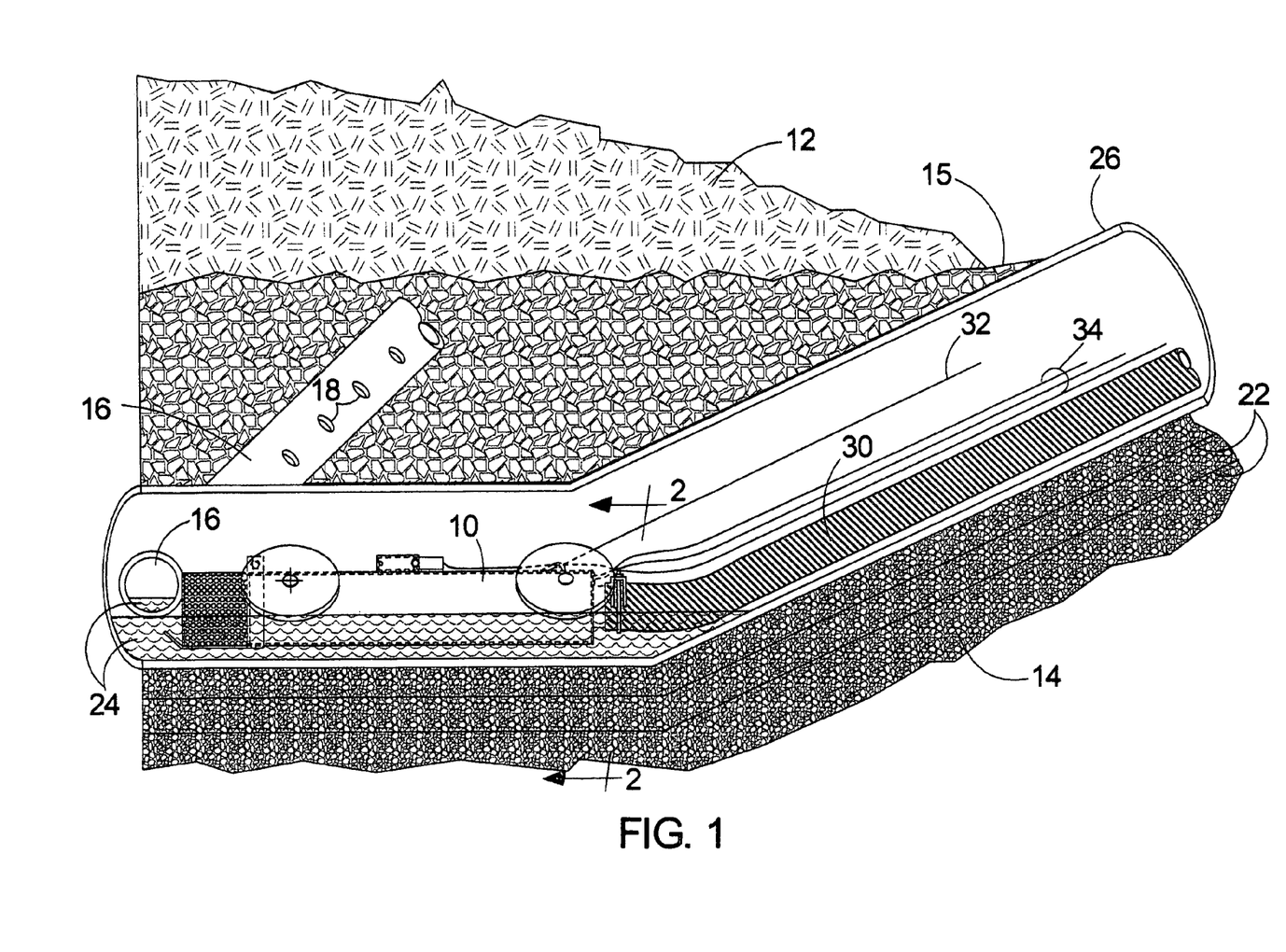
FIG. 1 is a partial cutaway elevational view of a landfill with a tubular transporter of the invention positioned within a leachate collection pipe system to which a series of perforated leachate feed pipes are connected.

Referring now to FIG. 1, a partial cutaway side elevation view of a landfill is shown with a dual-layer liquid impervious liner 22 placed on a section of ground 14. Use of two layers of liner 22 greatly increases the reliability and life of the landfill system. As noted briefly above, rain will periodically fall on landfill waste 12 and filter down to ground 14, carrying various contaminants. Liners 22 temporarily prevent the contaminated rain water from reaching and passing through ground 14 to enter the underground water system. A network of leach field feed pipes 16 connected to a central collection pipe 26 is installed on top of liners 22 with a layer of pervious gravel 15 placed above the pipe network 16, 26. The lower portion of collection pipe 26 is oriented substantially horizontally and rests at the bottom of the landfill. Landfill waste 12 is deposited onto ground 14 that typically forms a mound. Without intervention, the contaminated rain water will eventually overflow the rim of liners 22 and enter ground 14.

As water accumulates on upper liner 22, the leachate 24 will enter leach field feed pipes 16 through a series of seep holes 18 and then flow into the lower portion of collecting pipe 26. A tubular transporter 10 of the present invention is positioned in the lower portion of collecting pipe 26. As illustrated, the left end of tubular transporter 10 is the pump suction end for acquiring water from the surrounding environment. The right end of tubular transporter 10 is the discharge end for pumping water through a discharge hose 30. A pump, to be discussed below, is encased within transporter 10 with discharge hose 30 connected at the discharge end thereof. A retrieval cable or chain 32 is connected to tubular transporter 10 for pulling the apparatus out of collecting pipe 26 when necessary. A signal and power cable 34 is connected to the pump. The pump operates in response to a signal generated by the pressure sensor to remove leachate from collecting pipe 26 and pump the contaminated water through discharge hose 30 to a purification facility to enable reintroduction of purified water into the general water supply without health hazard.

Figure 2:
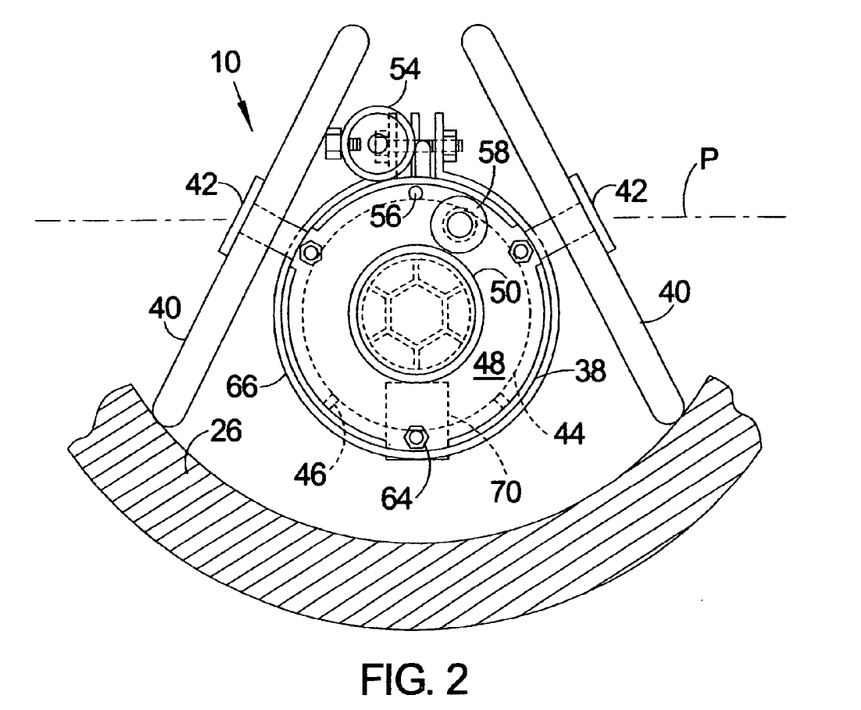
FIG. 2 is a view of the tubular transporter of FIG. 1 taken in the direction of line 2-2 of FIG. 1.

Referring now to FIG. 2, tubular transporter 10 is shown within a partial section of collecting pipe 26, taken in the direction of line 2-2 of FIG. 1. Tubular transporter 10 is moved along the inner surface of access pipe 26 on a set of wheels 40, preferably being 4 wheels. Wheels 40 are rotatably mounted to housing 38 of tubular transporter 10 on a set of non-parallel axles 42 that are oriented along respective radii of housing 38 in a configuration to position the center of gravity of tubular transporter 10 below a plane P drawn through the centers of rotation of wheels 40. The mounting angle and position of axles 42 are generally determined based on the diameter of tubular transporter 10 in relation to the diameter of collecting pipe 26. A sensor housing 54 is mounted to the upper portion of housing 38 to position a pressure sensor capable of determining when the level of contaminated rain water is sufficient to initiate the operation of pump 44. Pump 44 is mounted to end plate 48 and assembled into transporter 10 on centering blocks 46 as will be described below. A hose connector 50 is formed through end plate 48. A vent 56 is provided in the upper portion of end plate 48 to allow air to escape from within housing 38. A grommet 58 passes through end plate 48 to hold power wires for the operation of pump 44. Grommet 58 is preferably formed of a compressible material that will not be adversely affected by extended exposure to contaminated water, e.g. neoprene, to cushion a cable passing therethrough and prevent the cable from becoming abraded. A clamp ring 66 is provided to mount a screen to housing 38 with a skid plate 70 mounted to the screen. The structural components of tubular transporter 10 are preferably made of a stainless steel alloy or another material that is resistant to water damage.

Figure 3:
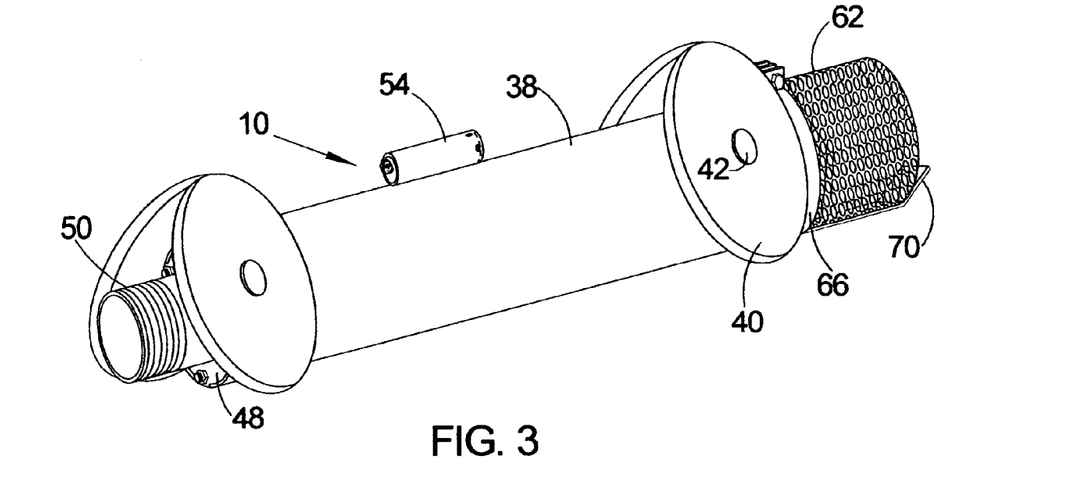
FIG. 3 is a perspective view of the tubular transporter of the invention.

Referring now to FIG. 3, tubular transporter 10 is shown in top perspective view. Four wheels 40 are angularly mounted rotatably to cylindrical housing 38 by axles 42 for moving transporter 10 along the inner surface of collecting pipe 26 (see FIG. 2). Sensor housing 54, configured for securely attaching a water depth sensor such as a pressure transducer, is mounted to the upper portion of housing 38. End plate 48 is mounted to the discharge end of housing 38 and screen 62 is mounted with clamp ring 66 to the suction end of housing 38 for preventing debris from entering the pump. A skid plate 70, formed with an inclined leading portion, is mounted to the lower portion of screen 62 to extend beyond the suction end of tubular transporter 10. Skid plate 70 aids in moving tubular transporter 10 over irregular surfaces, e.g. a welded seam in collecting pipe 26 (see FIG. 2). Other shapes of skid plate, e.g. having a curved leading portion, are considered within the scope of the invention. Hose connector 50 is formed with a series of external circumferential ridges for engaging discharge hose 30 (see FIG. 1).

Figure 4:
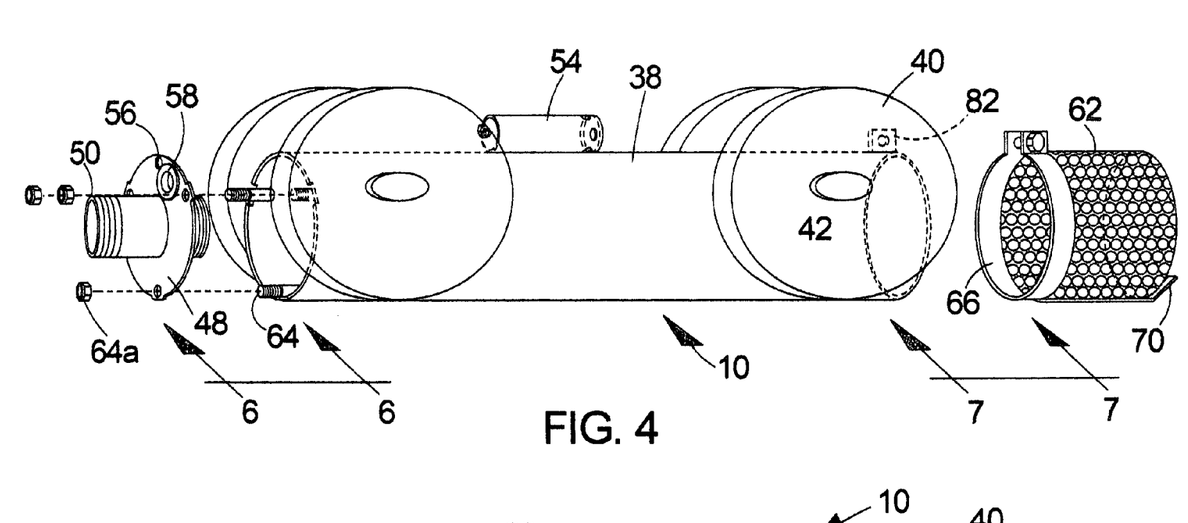
FIG. 4 is an exploded perspective view of the tubular transporter of the invention without a pump.

Referring now to FIG. 4, tubular transporter 10 is depicted with end plate 48 and screen 62 separated from housing 38 in exploded perspective view. As shown, housing 38 is cylindrical with both ends being substantially equal in diameter to permit insertion of equipment such as a pump into either end thereof. Upon assembly, screen 62 is mounted to the suction end of housing 38 by a loop 82 and clamp ring 66, provided for maintaining screen 62 in snug engagement with housing 38. Screen 62 mounts to the suction end of housing 38 in linear alignment thereto. Screen 62 is preferably formed in the shape of a cylinder with an open proximal end and a closed distal end to provide increased surface area as compared with a planar screen, thus improving water flow. End plate 48 is positioned for mounting at the discharge end of housing 38 by studs 64 and nuts 64a to reside perpendicular to the length of housing 38. Connector 50 is assembled through end plate 48 and has a pipe thread formed on an inner portion thereof for mounting a pump, and an outer portion adapted for receiving a flexible discharge hose. Vent 56 and grommet 58 pass through end plate 48. Wheels 40 are mounted above the centerline of housing 38 to achieve an angular orientation as described above.

Figure 5:
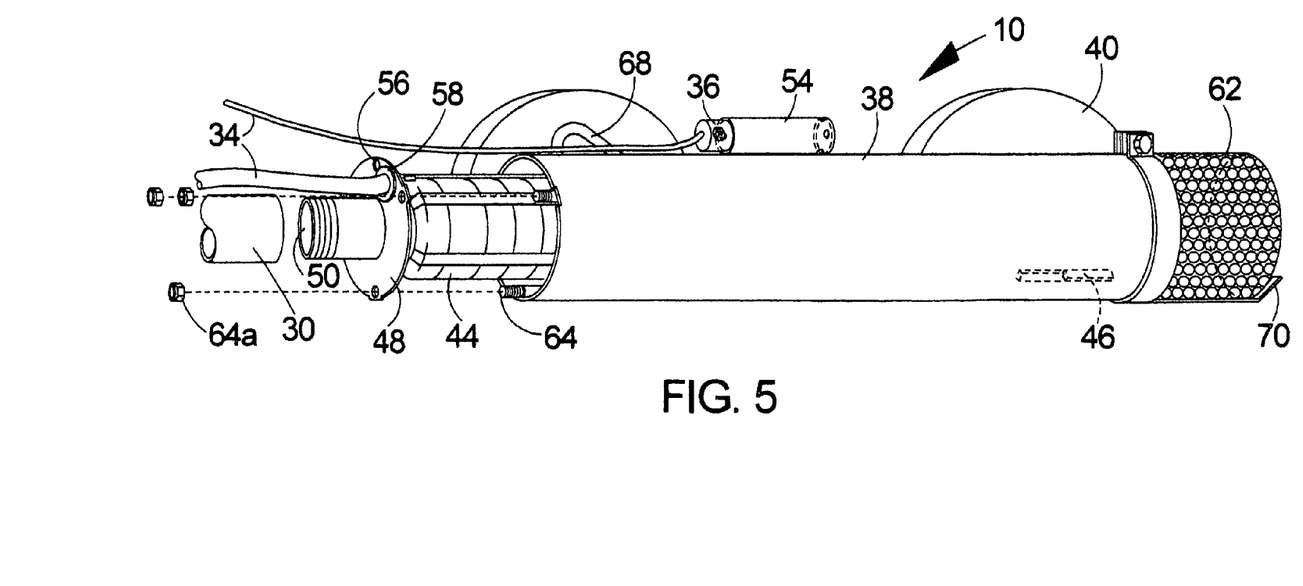
FIG. 5 is a partially exploded perspective view of the tubular transporter of the invention with the near-side wheels removed and a submersible pump being installed therein.

Referring now to FIG. 5, a sequential step is illustrated in assembly of tubular transporter 10. Screen 62 has been assembled to the suction end of housing 38. End plate 48 is mounted by the threaded inner portion of connector 50 to the discharge end of pump 44 that is positioned partly within housing 38. Pump 44 is preferably an electrically operated submersible rotary pump. A pair of blocks 46 are affixed to the inner surface of housing 38 to hold pump 44 oriented parallel to the axis of housing 38 and spaced apart from the inner surface of housing 38. A discharge hose 30 is positioned for installation on the ridged end of connector 50 to transmit leachate from pump 44 to a water treatment facility. When pump 44 is fully installed, the suction end of pump 44 resides at the right end (as shown) of housing 38 adjacent to, but not within, screen 62. Power cable 34 is threaded through grommet 58 and connected to pump 44. Grommet 58 serves to hold power cable 34 of pump 44 in position and avoid abrasion in passing through end plate 48. Pressure sensor 36 is installed in sensor housing 54 and secured in place by a set screw or other convenient means. A signal transmitter within cable 34 is connected from pressure sensor 36 to a pump controller. A retrieval loop 68 is provided on the upper outer surface of housing 38 for connection of cable or chain 32 (see FIG. 1) for withdrawing tubular transporter 10 from the pipe system for service, thereby avoiding strain on hose 30.

Figure 6:
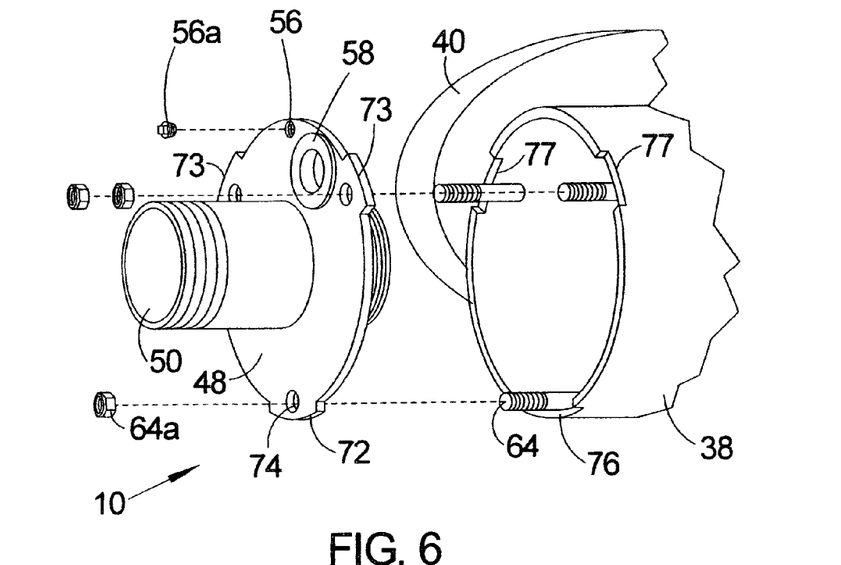
FIG. 6 is an enlarged exploded perspective view of the discharge end of the tubular transporter taken in the direction of line 6-6 of FIG. 4.

FIG. 6 shows an enlarged partial perspective view taken in the direction indicated by line 6-6 of FIG. 4 during the assembly process of the tubular transporter of the invention. Connector 50 is preferably affixed into a central hole in end plate 48, e.g. by welding. Studs 64 are assembled, e.g. by welding, to extend outward from the inner wall of housing 38 at substantially equal spacing from one another. A matching array of holes 74 is formed through end plate 48. Tabs 72 and 73 are formed to extend radially outward of the perimeter of end plate 48, each of tabs 72, 73 straddling a hole 74. Tabs 72, 73 are configured to snugly enter mating slots 76 and 77 formed in the exposed end of housing 38 when studs 64 are passed through holes 74, minimizing any tendency for end plate 48 to twist relative to housing 38 due to torque generated when pump 44 (see FIG. 5) is activated. Holes 74 and tabs 72, 73 are preferably located for mounting at 2:00 o'clock, 6:00 o'clock and 10:00 o'clock around the perimeter of end plate 48 so that vent hole 56 is positioned at 12:00 o'clock for readily eliminating air trapped in housing 38. Slots 76, 77 are similarly positioned and sized on the end of housing 38. In order to ensure that vent 56 is positioned at 12:00 o'clock relative to housing 38, tab 72 is of a first width and tabs 73 are of a second width, with slots 76 and 77 similarly sized. In a particular embodiment, tab 72 is 1 inch wide and tabs 73 are each ¾ inch wide. Tabs 72, 73 are formed with a curved outer edge to blend with the outer surface of housing 38, maintaining a smooth outer contour of housing 38. Alternately, tabs 72, 73 and slots 76, 77 are positioned at different angular locations around end plate 48 and housing 38 respectively. Optionally, a threaded plug 56a is provided and vent 56 has internal threads to enable vent 56 to be closed.

Figure 7:
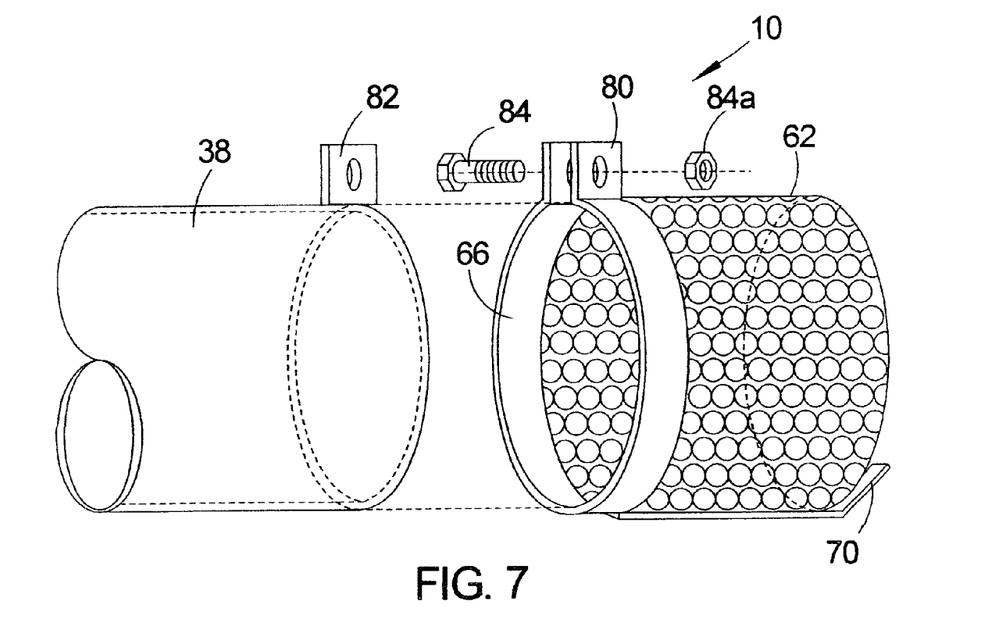
FIG. 7 is an enlarged exploded perspective view of the suction end of the tubular transporter taken in the direction of line 7-7 of FIG. 4.

FIG. 7 shows an enlarged partial perspective view taken in the direction indicated by line 7-7 of FIG. 4 during the assembly process. Screen 62 is positioned for being mounted onto the suction end of housing 38. Screen 62 mounts with clamp ring 66 encircling the end of housing 38. Clamp ring 66 is formed with a pair of opposed clamp tabs 80 having a coaxial hole formed through each to align with loop 82, affixed on housing 38. When clamp ring 66 encircles housing 38, clamp tabs 80 straddle loop 82 and bolt 84 is passed through the three aligned holes to be secured with a nut 84a.

Figure 8:
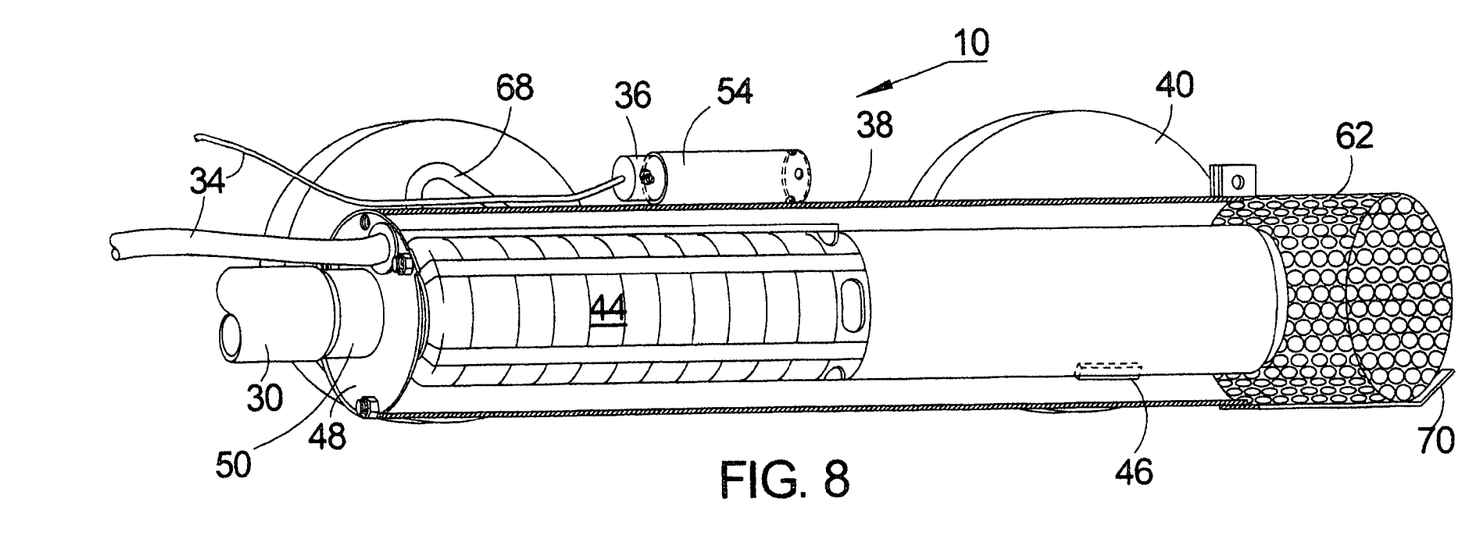
FIG. 8 is a perspective view of the tubular transporter in fully assembled condition with a portion of the housing thereof cutaway for visibility.

Referring now to FIG. 8, tubular transporter 10 of the invention is illustrated in fully assembled condition, with all connected components as described above. A portion of housing 38 is cut away to show pump 44 mounted therein.

As noted briefly above, in certain large landfills, the leachate collecting pipe is long, possibly on the order of several hundred feet in length. Tubular transporter 10 (see FIG. 1), cable 34 and trailing discharge hose 30 must be moved into position within collecting pipe 26 by pushing from the free end of collecting pipe 26 extending out of the landfill. When collecting pipe 26 is very long, considerable drag is developed due to the friction between discharge hose 30 and collecting pipe 26, increasing the difficulty of inserting tubular transporter 10 and discharge hose 30.

Figure 9:
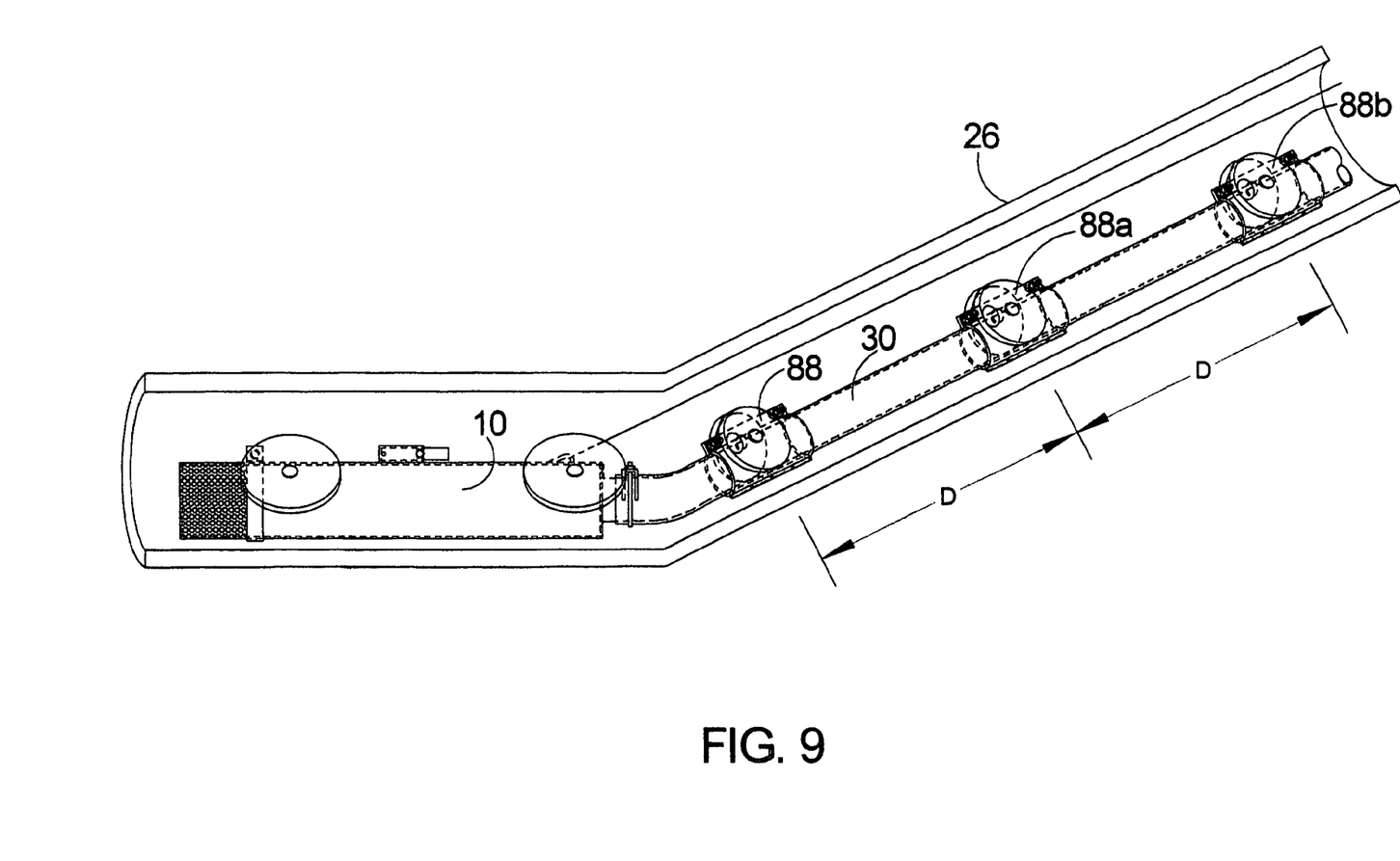
FIG. 9 is a side elevation view of a tubular transporter disposed within a landfill collecting pipe, according to a second embodiment including a series of hose dollies supporting segments of the pump discharge hose.

Referring now to FIG. 9, a further segment of the present invention is illustrated in side elevation view with leach field collecting pipe 26 cut away for clarity. Tubular transporter 10, as described above, is disposed in the lower, horizontal portion of collecting pipe 26 with discharge hose 30 trailing upward through the inclined portion of collecting pipe 26. A series of hose dollies 88, 88a and 88b are mounted to discharge hose 30 for allowing discharge hose 30 substantially to roll on wheels within collecting pipe 26. Hose dollies 88, 88a and 88b are separated from each other by a distance D, for example approximately a distance of 6 meters (20 feet). Accordingly, the number of hose dollies 88 employed is dependent on the length of discharge hose 30.

Figure 10:
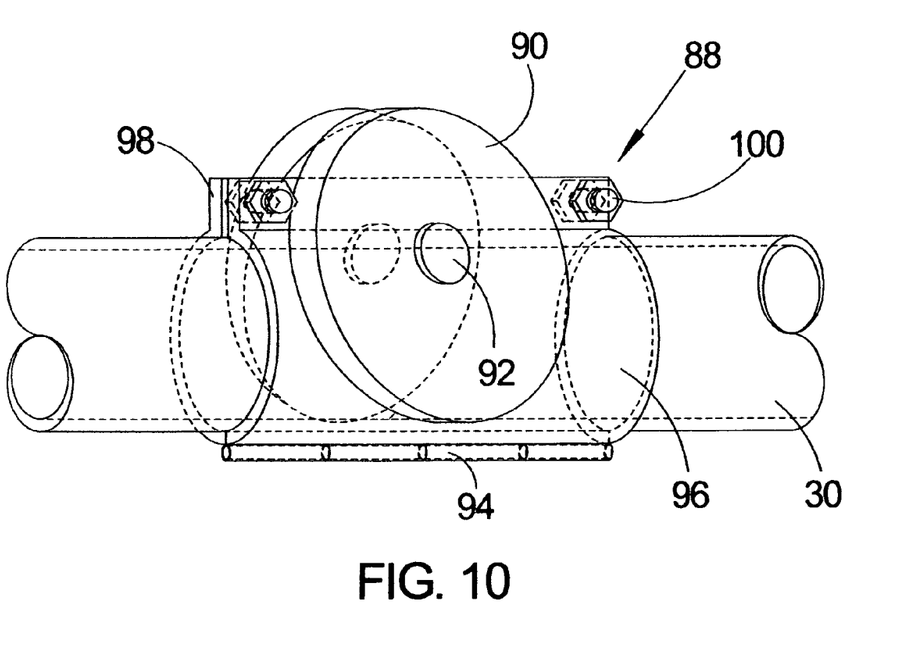
FIG. 10 is a side perspective view of the hose dolly of FIG. 9 mounted to the discharge hose.
Figure 11:
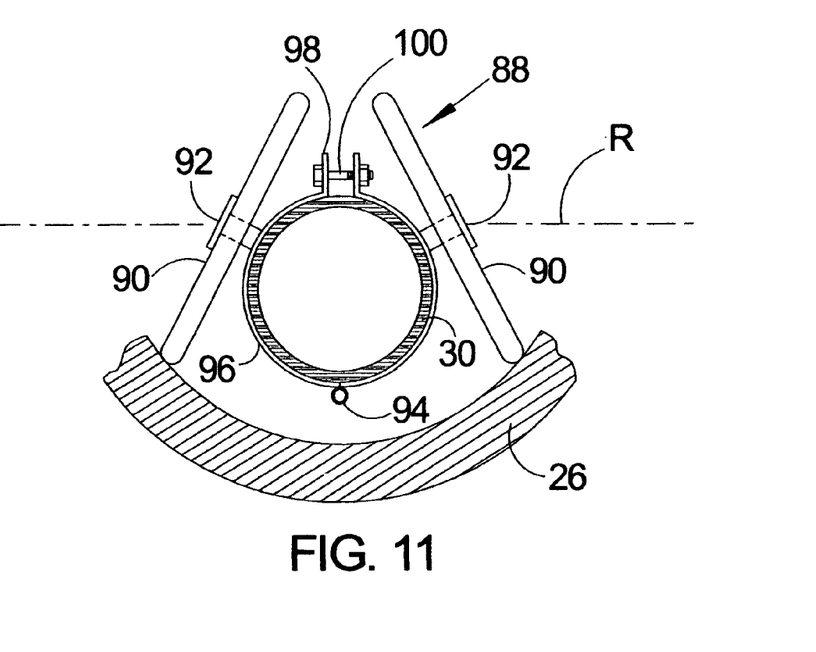
FIG. 11 is a partial cross sectional view of a hose dolly mounted to the pump discharge hose.

Referring now to FIGS. 10 and 11, hose dolly 88 is shown in perspective view and in end elevation view respectively in a section of collecting pipe 26, assembled to discharge hose 30. Hose dolly 88 is formed of a pair of mirror image semi-cylindrical tube segments 96 that are connected to one another with a hinge 94 for mounting hose dolly 88 at an intermediate position along discharge hose 30. Tube segments 96 are sized to snugly encircle discharge hose 30 in order to stay in place and resist movement relative to discharge hose 30. Hinge 94 is preferably a continuous length hinge, commonly known as a piano hinge. Alternate means of connecting tube segments 96, such as interlocking tabs and slots, are also considered to be within the scope of the invention. Tube segments 96 are each formed with a clamp tab 98 extending radially outward and positioned substantially opposed to the position of hinge 94 for holding tube segments 96 in snugly encircling engagement on discharge hose 30. Clamp tabs 98 have a matched set of holes to receive closure bolts 100 or other fasteners. A gap is retained between clamp tabs 98 for applying pressure of each tube segment 96 against discharge hose 30 as bolts 100 are tightened.

Referring further to FIGS. 10 and 11, a wheel 90 is mounted by means of an axle 92 to each tube segment 96. Whereas plural hose dollies 88 are mounted to discharge hose 30, two wheels 90 are provided for each hose dolly 88 in the preferred embodiment of the invention. Additional wheels 90, for example 4 wheels, may also be employed within the scope of the invention. The angular orientation and mounting of wheels 90 to tube segments 96 places a plane R through the center of rotation of wheels 90 above the center of gravity of discharge hose 30 substantially as described above with respect to the pump-carrying tubular transporter.

While the description above discloses preferred embodiments of the present invention, it is contemplated that numerous variations and modifications of the invention are possible and are considered to be within the scope of the claims that follow.

What is claimed is:

1. A tubular transporter for carrying a submersible pump along a longitudinal path within a pipe, the transporter having wheels rotatably mounted at an angle for positioning a center of gravity of the transporter lower than a plane passing through the center of rotation of the wheels, wherein the improvement comprises:
   a. the tubular transporter having a housing that is substantially equal in diameter from a suction end to a discharge end to permit insertion of a pump through both ends thereof;
   b. a planar end plate mounted to the discharge end of the housing and formed with a connector having a first end configured for receiving the submersible pump and a second end configured for receiving a discharge hose;
   c. a screen removably mounted to the suction end of the housing; and
   d. a pressure sensor mounting affixed to the housing and having a pressure sensor capable of determining liquid level.

2. The tubular transporter described in claim 1, wherein the screen is cylindrical with a first end open for mounting to the housing and a second end closed.

3. The tubular transporter described in claim 1, further comprising a vent hole formed through the end plate at a position for evacuating air from the housing wherein the end plate is configured in a manner requiring the end plate to mount to the housing with the vent hole at a selected location.

4. The tubular transporter described in claim 1, further comprising a skid plate mounted thereto and formed to ease the tubular transporter over obstacles.

5. The tubular transporter described in claim 1, wherein the end plate and the housing are each formed with mating means to prevent relative rotation therebetween and wherein the mating means are configured differently from one section to another to require a preferred angular alignment of the end plate relative to the housing.

6. The tubular transporter described in claim 5, wherein the mating means comprise a plurality of tabs extending radially outward from the end plate and a plurality of matching slots formed in an end of the housing.

7. The tubular transporter described in claim 6, wherein the tabs are formed with a peripheral contour configured to blend with the housing.

8. A tubular transporter for carrying a submersible pump along a longitudinal path within a pipe, the transporter having wheels rotatably mounted thereto at an angle for positioning the center of gravity of the transporter lower than a plane passing through the center of rotation of the wheels, wherein the improvement comprises:
- a. the tubular transporter having a cylindrical housing with a suction end and a discharge end;
- b. a planar end plate mounted to the discharge end of the housing and formed with a connector configured for connecting the submersible pump to a discharge hose, the end plate formed with a vent hole therethrough;
- c. a screen removably mounted to the suction end of the housing;
- d. mating means formed on the end plate and the housing to prevent relative rotation therebetween;
- e. a plurality of tube segments for snugly encircling the discharge hose;
- f. means for opening and closing the tube segments; and
- g. a plurality of wheels rotatably mounted to the tube segments at an angle for positioning the center of gravity of the discharge hose lower than a plane passing through the center of rotation of the wheels.

9. The tubular transporter described in claim 8, wherein the mating means are configured differently from one another to require a preferred angular alignment of the end plate relative to the housing.

10. The tubular transporter described in claim 8, wherein the mating means comprise a plurality of tabs extending radially outward from the end plate and a plurality of matching slots formed in an end of the housing.

11. The tubular transporter described in claim 10, wherein the tabs are formed with a peripheral contour configured to blend with the housing.

12. The tubular transporter described in claim 8, wherein the screen is three dimensional with a first end open for mounting to the housing and a second end closed.

13. The tubular transporter described in claim 8, further comprising a skid plate mounted thereto and formed to ease the tubular transporter over obstacles.

14. The tubular transporter described in claim 8, wherein the plurality of tube segments comprises a pair of mirror image semi-cylindrical tube segments.

15. The tubular transporter described in claim 14, wherein the means for opening and closing the plurality of tube segments comprises a hinge.

16. The tubular transporter described in claim 8, further comprising means for holding the plurality of tube segments snugly in contact with the discharge hose.

17. The tubular transporter described in claim 16, wherein the means for holding the tube segments comprises a pair of clamping tabs spaced apart from one another to retain a gap therebetween and configured to receive fasteners, the gap being for maintaining pressure of the tube segments against the discharge hose.

* * * * *